United States Patent
Wheeler et al.

(10) Patent No.: US 10,049,654 B1
(45) Date of Patent: Aug. 14, 2018

(54) ACCELEROMETER-BASED EXTERNAL SOUND MONITORING

(71) Applicant: Ford Global Technologies, LLC, Dearborn, MI (US)

(72) Inventors: Joshua Wheeler, Trenton, MI (US); Scott Andrew Amman, Milford, MI (US); Doug B. Thornburg, Dearborn, MI (US); Brian Bennie, Sterling Heights, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/675,182

(22) Filed: Aug. 11, 2017

(51) Int. Cl.
*B60Q 1/00* (2006.01)
*G10K 15/02* (2006.01)
*G10K 15/04* (2006.01)

(52) U.S. Cl.
CPC ............ *G10K 15/02* (2013.01); *G10K 15/04* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 5,748,075 A | 5/1998 | Dirmeyer et al. | |
| 6,057,660 A | 5/2000 | Meier et al. | |
| 6,732,566 B2 | 5/2004 | Roelleke et al. | |
| 6,889,189 B2 | 5/2005 | Boman | |
| 7,016,836 B1 | 3/2006 | Yoda | |
| 7,149,318 B2 | 12/2006 | Bank et al. | |
| 7,697,698 B2 | 4/2010 | Brown | |
| 7,853,026 B2 | 12/2010 | DeLine et al. | |
| 8,077,022 B2 | 12/2011 | Baruco et al. | |
| 8,165,875 B2 | 4/2012 | Hetherington et al. | |
| 8,515,095 B2 | 8/2013 | Bard | |
| 8,724,832 B2 | 5/2014 | Stephanou et al. | |

(Continued)

FOREIGN PATENT DOCUMENTS

| CN | 104405272 B | 1/1916 |
|---|---|---|
| CN | 103770736 B | 12/1916 |

(Continued)

OTHER PUBLICATIONS

Christian Bolzmacher et al., Transforming Car Glass Into Microphones Using Piezoelectric Transducers, Microsystem Technologies, Jul. 2016, vol. 22, Issue 7, 3 pages.

(Continued)

*Primary Examiner* — Thomas McCormack
(74) *Attorney, Agent, or Firm* — James P. Muraff; Neal, Gerber & Eisenberg LLP

(57) ABSTRACT

Method and apparatus are disclosed for accelerometer-based external sound monitoring. A vehicle includes accelerometers, speakers, and an infotainment head unit. The accelerometers are affixed to windows of the vehicle. The speakers are located inside the vehicle in the vicinity of the accelerometers. Each of the speakers is uniquely associated with one of the accelerometers. The infotainment head unit, when the vehicle is not in motion and when a signal is received from one of the accelerometers, plays the signal only on the associated one of the speakers.

15 Claims, 3 Drawing Sheets

(56) References Cited

U.S. PATENT DOCUMENTS

| | | |
|---|---|---|
| 8,849,656 B2 | 9/2014 | Schmidt et al. |
| 8,996,383 B2 | 3/2015 | Rodemer |
| 9,014,392 B2 | 4/2015 | Sato et al. |
| 9,020,690 B2 | 4/2015 | McKown et al. |
| 9,154,893 B1* | 10/2015 | Breed ................ G01C 21/3691 |
| 9,263,040 B2 | 2/2016 | Tzirkel-Hancock et al. |
| 9,330,684 B1 | 5/2016 | Kirsch |
| 9,469,247 B2 | 10/2016 | Juneja et al. |
| 9,539,984 B2 | 1/2017 | Dias |
| 9,870,697 B2* | 1/2018 | Frew ...................... G08B 25/10 |
| 2005/0071159 A1 | 3/2005 | Boman et al. |
| 2005/0074131 A1 | 4/2005 | McCall et al. |
| 2006/0184361 A1 | 8/2006 | Lieb |
| 2008/0273711 A1 | 11/2008 | Broussard |
| 2009/0125311 A1 | 5/2009 | Haulick et al. |
| 2013/0188794 A1* | 7/2013 | Kawamata ............. G01S 3/803 |
| | | 381/56 |
| 2013/0308784 A1 | 11/2013 | Dickens et al. |
| 2015/0117155 A1 | 4/2015 | Jang et al. |
| 2015/0139428 A1 | 5/2015 | Reining |
| 2015/0156587 A1 | 6/2015 | Herbig et al. |
| 2015/0365743 A1 | 12/2015 | Koningsberg et al. |
| 2016/0119890 A1 | 1/2016 | Amman et al. |
| 2016/0217689 A1 | 7/2016 | Young et al. |
| 2016/0355125 A1 | 12/2016 | Herbert |
| 2017/0018127 A1 | 1/2017 | Yang et al. |
| 2017/0118556 A1 | 4/2017 | Macours |

FOREIGN PATENT DOCUMENTS

| | | |
|---|---|---|
| DE | 10164509 A1 | 7/2003 |
| DE | 10254684 A1 | 6/2004 |
| DE | 102009046132 A1 | 5/2011 |
| DE | 102011003730 A1 | 7/2011 |
| FR | 2825882 A1 | 12/2002 |
| JP | 3802897 B2 | 5/2006 |
| JP | 2010000963 A | 1/2010 |
| KR | 1020160150554 B1 | 6/1998 |
| KR | 101018783 B1 | 3/2011 |
| WO | WO 98/047109 A1 | 10/1998 |
| WO | WO 2013/90007 A1 | 6/2013 |

OTHER PUBLICATIONS

Piezo Acoustics: Turning, Windows into Invisible Speakers and Helping James Bond Keep Secrets, 4 pages.

Karen M., Stickable Sound Pads Turn Any Surface Into a Speaker, Jul. 30, 2008,4 pages.

Benson, K. Blair et al. Standard handbook of Audio and Radio Engineering. McGraw-Hill, 2002, p. 1-10.

* cited by examiner

ACCELEROMETER-BASED EXTERNAL SOUND MONITORING

TECHNICAL FIELD

The present disclosure generally relates to vehicle sound systems and, more specifically, accelerometer-based external sound monitoring.

BACKGROUND

Increasingly, with customer comfort in mind, vehicles are being manufactured with improved sealing and noise cancellation systems to isolate exterior noises from the interior of the cabin. This helps keep the driving experience comfortable and noise free. However, in some instances, blocking the exterior noise can be disadvantageous. For example, when a police officer is parked in their car while doing computer work in their vehicle or idling alongside a road monitoring passing vehicles for speed or traffic violations, they may have their windows up for security or comfort in poor weather. However, in such an example, the police office still wants to maintain awareness of events around the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for accelerometer-based external sound monitoring. A vehicle includes accelerometers, speakers, and an infotainment head unit. The accelerometers are affixed to windows of the vehicle. The speakers are located inside the vehicle in the vicinity of the accelerometers. Each of the speakers is uniquely associated with one of the accelerometers. The infotainment head unit, when the vehicle is not in motion and when a signal is received from one of the accelerometers, plays the signal only on the associated one of the speakers.

An example system includes speakers positioned in an interior of a vehicle, audio channels, accelerometers, and an infotainment head unit. Each one of the audio channels is associated with only one of the speakers. The accelerometers are affixed to windows of the vehicle. Each one of the accelerometers is associated with only one of the audio channels. The infotainment head unit, when a signal is received from one of the accelerometers, drives the signal onto the corresponding one of the audio channels.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
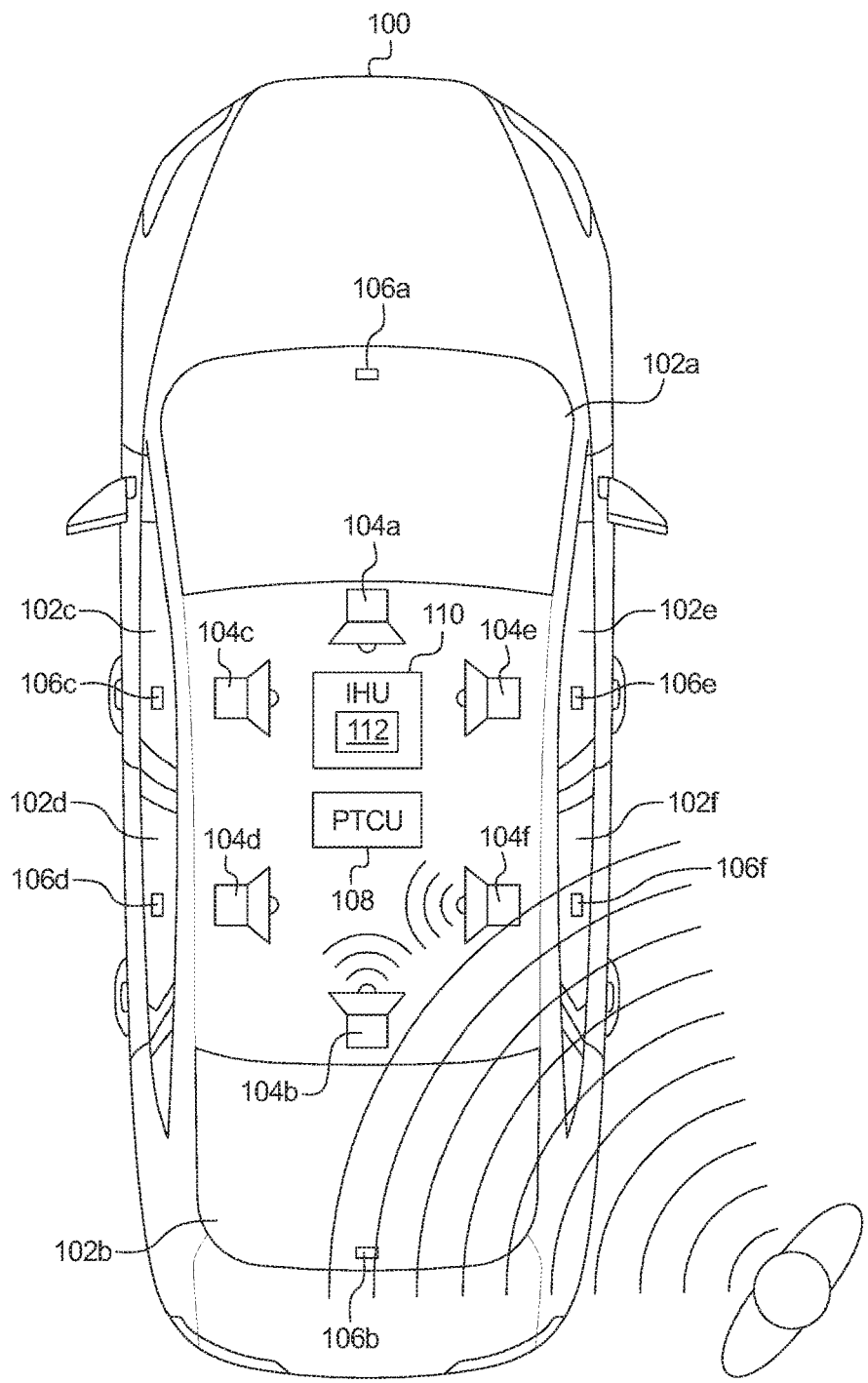
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, passenger comfort is increased by isolating exterior noise from the interior of the cabin. In some instances, isolating the exterior noise from the interior of the cabin is not desirable. For example, when an occupant is sitting in a parked or idle vehicle, the occupants may be distracted but still desired to be aware of activity surrounding the vehicle. Microphones on the outside of the vehicle could broadcast the exterior sound inside the vehicle, so the occupant would be aware of their surroundings when the doors and windows are closed. However, traditional electric condenser microphones (ECMs) are not constructed for external use. Their delicate microphone diaphragms can be rendered unusable by dirt, snow, rain, or mud.

As disclosed below, accelerometers are placed on the edge of vehicle glass surfaces. Sound causes oscillation as it travels through a medium, such as the glass surfaces of the vehicle. This oscillation is measured as a vibration with the accelerometer when the pressure wave impinges on a window of the vehicle. The resulting electrical output from the accelerometer is processed to reproduce the sound to be played into the cabin. Accelerometers are installed on the windows (e.g., the windshield, the back glass, the left front door glass, the left backseat door glass, the right front door glass, the right backseat door glass, the moon roof, etc.) of the vehicle. The sounds captured by the accelerometers are played only on adjacent speakers inside the vehicle. For example, the signal from left front door glass accelerometer may be played only on a speaker embedded in the left front door, the signal from left backseat door glass accelerometer may be played only on a speaker embedded in the left backseat door, the signal from right front door glass accelerometer may be played only on a speaker embedded in the right front door, the signal from right backseat door glass accelerometer may be played only on a speaker embedded in the right backseat door, the signal from the windshield accelerometer may be played on a speaker embedded in the dashboard, the signal from the rear glass accelerometer may be played on a speaker embedded in the rear package tray or the rear door, and/or the signal from the moon roof accelerometer may be played on a speaker embedded in the ceiling. In such a manner, the sound system of vehicle provides a surround sound experience that facilitates monitoring audible activity outside the vehicle while providing a robust system that is resistant to environmental factors, such as by dirt, snow, rain, or mud.

FIG. 1 illustrates a vehicle 100 operating in accordance with the teachings of this disclosure. In some examples, the vehicle 100 is a police vehicle. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a power train with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes windows 102a-102f, speakers 104a-104f, accelerometers 106a-106f, a power train control unit (PTCU) 108, and a infotainment head unit (IHU) 110.

The windows include a windshield 102a, a back glass 102b, a left front door glass 102c, a left backseat door glass 102d, a right front door glass 102e, a right backseat door glass 102f, and/or a moon roof (not shown). Some of the windows 102a-102f are made of laminated glass (sometimes referred to as "safety glass") (e.g., the windshield 102a, etc.) and some of the windows 102a-102f are made of non-laminated tempered glass (e.g., the left front door glass 102c, the left backseat door glass 102d, the right front door glass 102e, the right backseat door glass 102f, etc.). The glass of the windows 102a-102f vibrates when struck by sound waves.

Each one of the speakers 104a-104f is positioned to correspond with one of the windows 102a-102f. A speaker 104a corresponding to the windshield 102a is embedded in the dashboard, a speaker 104b corresponding to the back glass 102b is embedded into a rear package tray or a rear door (e.g., a liftgate, etc.), a speaker 104c corresponding to the left front door glass 102c is embedded in the side panel of the left front door, a speaker 104d corresponding to the side panel of the left backseat door glass 102d in embedded in the left backseat door, a speaker 104e corresponding to the right front door glass 102e is embedded into the side panel of the right front door, a speaker 104f corresponding to the right backseat door glass 102f is embedded into the side panel of the right backseat door, and/or a speaker (not shown) corresponding to the moon roof is embedded into the ceiling panel proximate the moon roof. Alternatively, in some examples, the speakers 104a-104f are ribbon speakers that are embedded into the ceiling liner around the parameter of the ceiling of the cabin of the vehicle 100 proximate the corresponding window 102a-102f. In some examples, the speakers 104a-104f are integrated into the audio sound system (e.g., the radio, the digital media player, etc.) and/or noise cancellation system of the vehicle 100. Alternatively, the speakers 104a-104f are separate from the speakers associated with the audio sound system and/or noise cancellation system of the vehicle 100.

The accelerometers 106a-106f may be any type of accelerometer that (a) measures the vibrations perpendicular to the plane of glass of the corresponding window 102a-102f and (b) measures a wide frequency range (e.g., the frequency range of audible sound, etc.), including uniaxial or triaxial accelerometers, micromachined or piezoelectric accelerometers, etc. Each one of the accelerometers 106a-106f is rigidly mounted on a corresponding one of the windows 102a-102f on the interior of the cabin of the vehicle 100. In some example, the accelerometers 106a-106f are mounted on the windows 102a-102f in a manner as to no obstruct the view of the driver. For example, the accelerometer 106a on the windshield 102a may be attached to the glass of the windshield 102a proximate to where the rear-view mirror is mounted. As another example, the accelerometer 106b on the back glass 102b may be attached to the glass of the back glass 102b proximate to the rear defroster connector on the glass or where the rear brake light is mounted. The accelerometers are wired or wirelessly communicatively coupled to the infotainment head unit 110 to send signals of the vibrations of the windows 102a-102f to the infotainment head unit 110.

The power train control module 108 includes hardware and firmware to control the ignition, fuel injection, emission systems, transmission and/or the brake system of the vehicle 100. The power train control module 108 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. In the illustrated example, the power train control module 108 sends messages via a vehicle data bus (e.g., via the vehicle data bus 202 of FIG. 2) regarding the state of the engine (e.g., running, idling, stopped, etc.).

The infotainment head unit 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display. The infotainment head unit 110 includes a physical button or a soft button (e.g., via the infotainment system) to enable and disable the accelerometer-based external sound monitoring system. In the illustrated example, the infotainment head unit includes a sound monitor 112.

The sound monitor 112, when the accelerometer-based external sound monitoring system is enabled, receives the signals from the accelerometers 106a-106f, processes the signals, and plays sounds based on the signals on the corresponding speakers 104a-104f. Additionally, when the external sound monitoring system is enabled, the sound monitor 112 disables other sources of audio (e.g., the radio, the digital media player, etc.). When the sound monitor 112 receives a signal from one of the accelerometers 106a-106f, the sound manager processes the signal. In some examples, the sound monitor 112 processes the signal with a high pass filter to filter out frequencies associated with low-frequency boom or rumble (e.g., such as those caused by wind, etc.). In some examples, the sound monitor 112 performs other sound signal processing, such as amplification and/or equalization.

The sound monitor 112 is coupled to separate channels, each associated with one of the speakers 104a-104f. When a signal from one of the accelerometers 106a-106f is received, the sound monitor 112 only drives the channel corresponding to the one of the speakers 104a-104f that is associated with the particular one of the accelerometers 106a-106f from which the signal was received. For example, when the signal is received from the accelerometer 106a attached to the windshield 102a, the sound monitor 112 drives the channel associated with the speaker 104a embedded in the dashboard. When multiple signals from multiple accelerometers 106a-106f are received, the sound monitor 112 drives multiple channels with the corresponding signal. For example, when a first signal is received from the accelerometer 106a attached to the windshield 102a and a second signal received from the accelerometer 106b attached to the back glass 102b at the same time, the sound monitor 112 drives the channel associated with the speaker 104a embedded in the dashboard with the first signal and the speaker 104b embedded in the rear package tray or the rear door with the second signal. In such a manner, the sound monitor 112 provides a surround sound experience based on the actual direction that the noise is originating from so the occupant(s) of the vehicle 100 can determine the location of the noise. For example, if a person is speaking while standing at the external rear right corner of the vehicle 100, the accelerometer 106b attached the back glass 102b and the accelerometer 106f attached to the right backseat door glass 102f may generate signals. In such an example, the sound monitor 112 may drive the channels associated with the speaker 104b embedded in the rear package tray or the rear door and the speaker 104f embedded in the side panel of the right backseat door.

Figure 2:
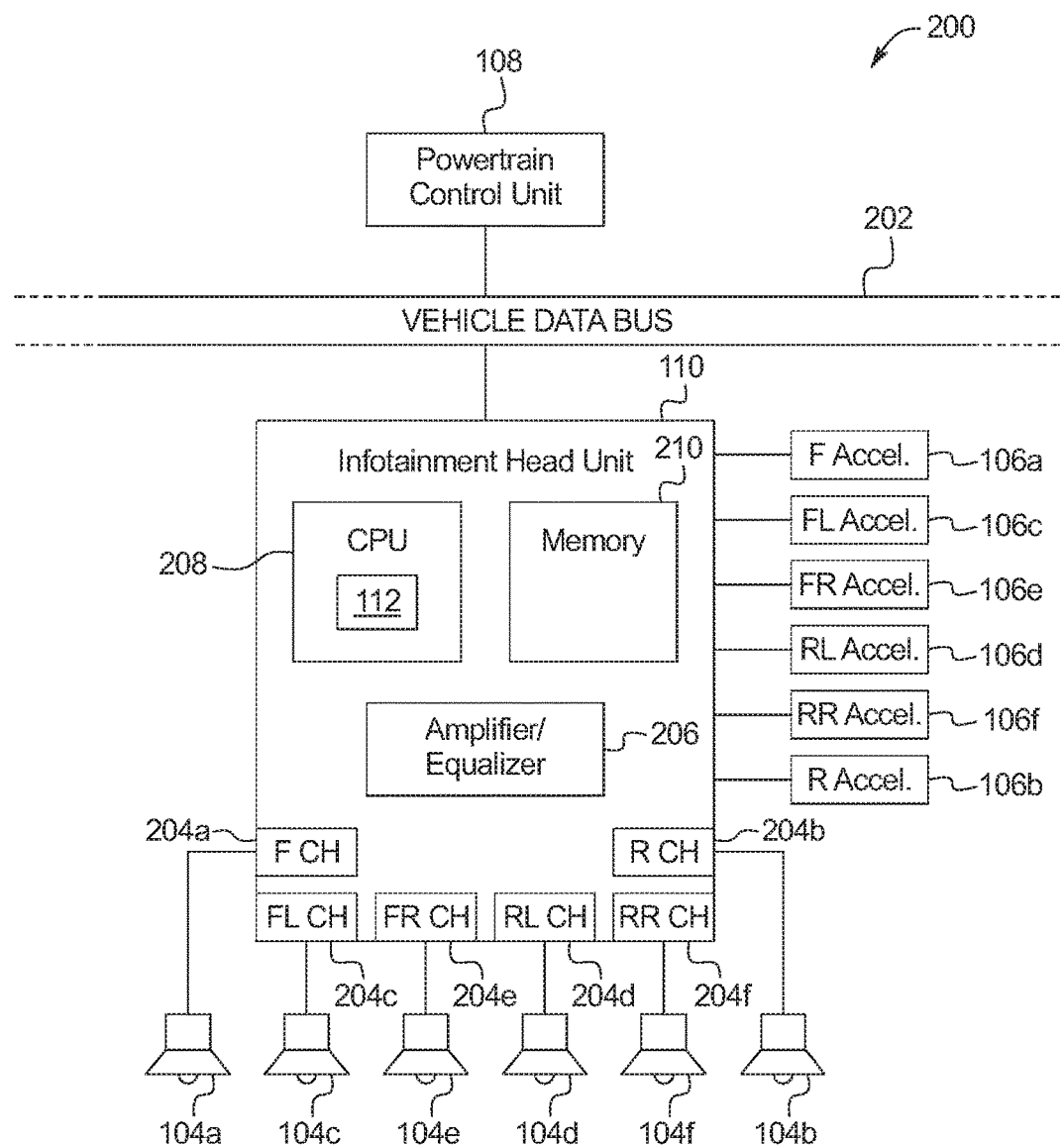
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the speakers 104a-104f, the accelerometers 106a-106f, the power train control module 108, the infotainment head unit 110, and a vehicle data bus 202.

The infotainment head unit 110 includes channels 204a-204f, an amplifier/equalizer 206, a processor 208, and memory 210. The channels 204a-204f are electrically coupled to the speaker 104a-104f. The channels 204a-204f are communicatively coupled to the amplifier/equalizer 206. When a signal is received from one of the accelerometers 106a-106f, the sound monitor 112, via the amplifier/equalizer 206, drivers the signal on the corresponding of the channels 204a-204f. The amplifier/equalizer 206 receives the signals from the accelerometers 106a-106f and process the signals to be suitable for reproduction (e.g., amplify the signal, etc.) on the speakers 104a-114f based on, for example, audio preferences and settings entered into the infotainment head unit 110 by an occupant.

In the illustrated example, the infotainment head unit 110 is structured to include sound monitor 112. The processor or controller 208 may be any suitable processing device or set of processing devices such as, but not limited to: a microprocessor, a microcontroller-based platform, a digital signal processor, a suitable integrated circuit, one or more field programmable gate arrays (FPGAs), and/or one or more application-specific integrated circuits (ASICs). The memory 210 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 210 includes multiple kinds of memory, particularly volatile memory and non-volatile memory.

The memory 210 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the processor 208 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the power train control module 108 and the infotainment head unit 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
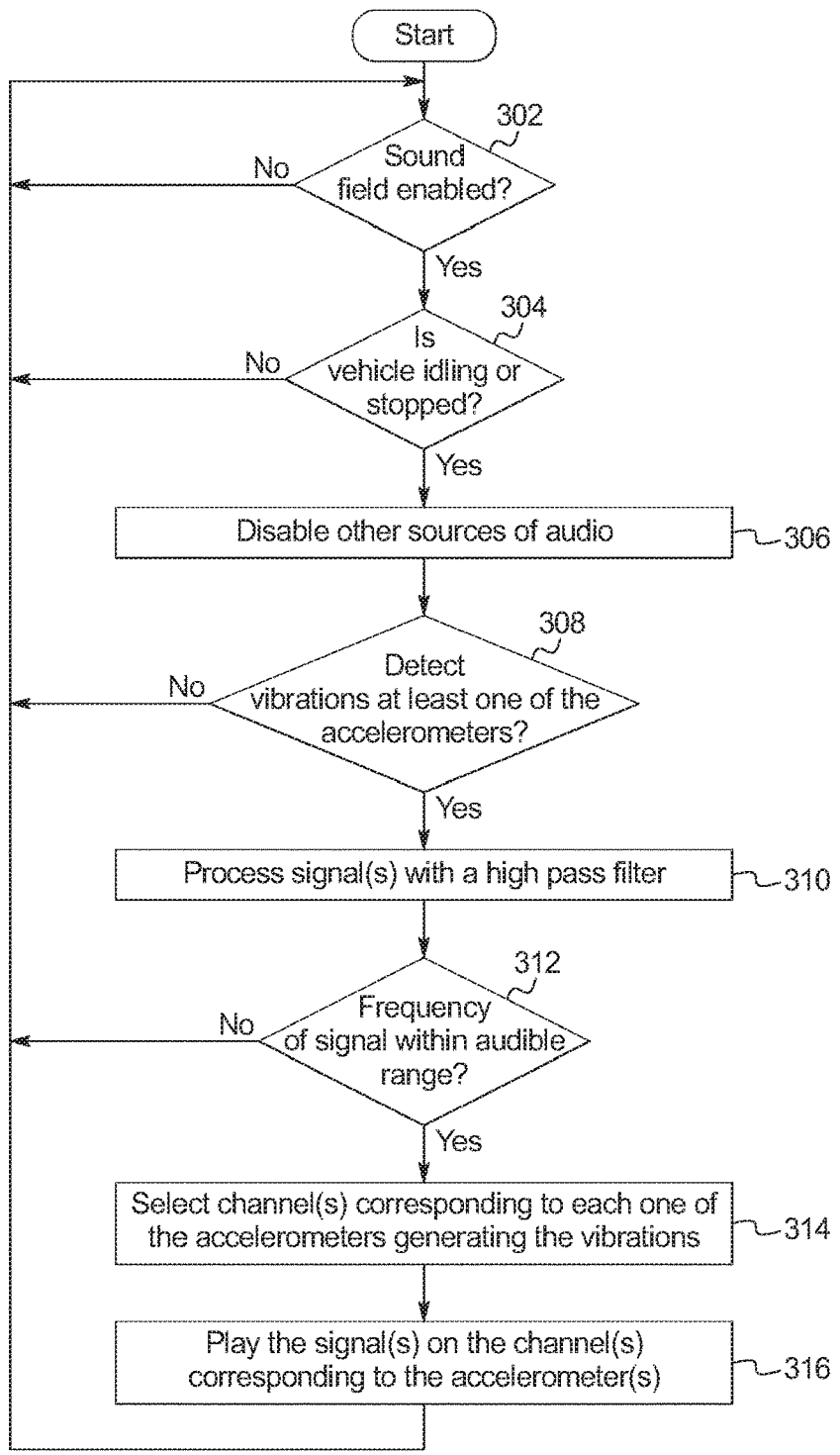
FIG. 3 is a flowchart of a method to provide external noise into the cabin of the vehicle of FIG. 1, which may be implemented by the electronic components of FIG. 2.

FIG. 3 is a flowchart of a method to provide external noise into the cabin of the vehicle 100 of FIG. 1, which may be implemented by the electronic components 200 of FIG. 2. Initially, at block 302, the sound monitor 112 waits until the external sound system is enabled via the infotainment head unit 110. At block 304, the sound monitor 112 determines whether the vehicle 100 is stopped (e.g., the engine is off, etc.) or idling (e.g., the transmission is shifted into park, etc.). When the vehicle 100 is stopped or idling, the method continues at block 306. Otherwise, when the vehicle 100 is neither stopped nor idling, the method returns to block 302. At block 306, the sound monitor 112 disables other sources of audio in the cabin of the vehicle 100, such as audio from a radio receiver, an auxiliary connection to a media playing device, a wireless connection to the media playing device, and/or an internal digital media player, etc.

At block 308, the sound monitor 112 determines whether signals from at least one of the accelerometers 106a-106f is/are detected. When the signals from at least one of the accelerometers 106a-106f is/are detected, the method continues at block 310. Otherwise, when signals from are not detected from any of the accelerometers 106a-106f, the method returns to block 302. At block 310, the sound monitor 112 processes the signals to be reproduced over the sound system (e.g., the speakers 104a-104f, etc.) of the vehicle 100, such as processing with a high pass filter. At block 312, the sound monitor 112 determines whether the signals include sounds in the audible frequency range (e.g. 20 to 20,000 Hertz). When the signals represent sound in the audible frequency range, the method continues at block 314. Otherwise, when the signals do not include sounds in the audible frequency range, the method returns to block 302. At block 314, the sound monitor 112 only selects the channel(s) 204a-204f corresponding to each one of the accelerometers 106a-106f from which the signal(s) were received. At block 316, the sound monitor 112 plays the signal(s) on the selected channel(s) 204a-204f corresponding to each one of the accelerometers 106a-106f from which the signal(s) were received.

The flowchart of FIG. 3 is representative of machine readable instructions stored in memory (such as the memory 210 of FIG. 2) that comprise one or more programs that, when executed by a processor (such as the processor 208 of FIG. 2), cause the vehicle 100 to implement the example sound monitor 112 and, more generally, the infotainment head unit 110 of FIGS. 1 and 2. Further, although the example program(s) is/are described with reference to the flowchart illustrated in FIG. 3, many other methods of implementing the example sound monitor 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   accelerometers affixed to windows of the vehicle;
   speakers located inside the vehicle in a vicinity of the accelerometers, each of the speakers uniquely associated with one of the accelerometers; and
   an infotainment head unit to, when the vehicle is not in motion and when a signal is received from one of the accelerometers, play the signal only on the associated one of the speakers.

2. The vehicle of claim 1, including at least six of the accelerometers, each one of the accelerometers affixed to a different one of the windows.

3. The vehicle of claim 2, including at least six of the speakers, two of the speakers embedded in a first interior side of a cabin, two of the speakers embedded in a second interior side of the cabin, one of the speakers embedded in as interior front of the vehicle, and one of the speakers embedded in an interior rear of the vehicle.

4. The vehicle of claim 1, wherein the accelerometers are to measure vibrations perpendicular to a glass surface of the windows.

5. The vehicle of claim 1, wherein the infotainment head unit is to, when the vehicle is not in motion, disable sound from other audio sources.

6. The vehicle of claim 1, wherein the speakers are positioned in the vehicle to provide sound in an interior of a cabin of the vehicle from a direction of an originator of the sound on an exterior of the vehicle.

7. The vehicle of claim 1, wherein the vehicle is a police vehicle.

8. The vehicle of claim 1, wherein the speakers are ribbon speakers positioned in a headliner of the vehicle.

9. A system comprising:
   speakers positioned in an interior of a vehicle;
   audio channels, each one of the audio channels associated with only one of the speakers;
   accelerometers affixed to windows of the vehicle, each one of the accelerometers associated with only one of the audio channels; and
   an infotainment head unit to, when a signal is received from one of the accelerometers, drive the signal onto the corresponding one of the audio channels.

10. The system of claim 9, including at least six of the accelerometers, each one of the accelerometers affixed to a different one of the windows.

11. The system of claim 10, wherein a first one of the speakers is embedded in a left front door, a second one of the speakers is embedded in a left backseat door, a third one of the speakers is embedded in a right front door, a fourth one of the speakers is embedded in a right backseat door, a fifth one of the speakers is embedded in a dashboard, and a sixth one of the speakers is embedded in a rear panel.

12. The system of claim 9, wherein the accelerometers are to measure vibrations perpendicular to a glass surface of the windows.

13. The system of claim 9, wherein the infotainment head unit is to drive the signal onto the corresponding one of the audio channels only when the vehicle is not in motion.

14. The system of claim 13, wherein the infotainment head unit is to, when the vehicle is not in motion, disable sound from other audio sources.

15. The system of claim 9, wherein the speakers are positioned in the vehicle to provide sound in an interior of a cabin of the vehicle from a direction of an originator of the sound on an exterior of the vehicle.

* * * * *